(12) United States Patent
Morse

(10) Patent No.: US 8,442,477 B2
(45) Date of Patent: May 14, 2013

(54) TRAFFIC RECEIVER AND POWER ADAPTER FOR PORTABLE NAVIGATION DEVICES

(75) Inventor: Larry G. Morse, Olathe, KS (US)

(73) Assignee: Garmin Switzerland GmbH (CH)

( * ) Notice: Subject to any disclaimer, the term of this patent is extended or adjusted under 35 U.S.C. 154(b) by 910 days.

(21) Appl. No.: 12/098,044

(22) Filed: Apr. 4, 2008

(65) Prior Publication Data

US 2009/0121946 A1    May 14, 2009

Related U.S. Application Data

(60) Provisional application No. 60/986,823, filed on Nov. 9, 2007.

(51) Int. Cl.
*H05K 11/02* (2006.01)
(52) U.S. Cl.
USPC .......... 455/345; 455/562.1; 174/110 R; 174/113 C; 439/638; 439/639; 340/12.5
(58) Field of Classification Search .............. 455/345, 455/562.1; 343/905; 725/143; 174/113 R, 174/110 R, 113 C; 340/12.5; 701/200; 439/638, 439/639
See application file for complete search history.

(56) References Cited

U.S. PATENT DOCUMENTS

| | | | | |
|---|---|---|---|---|
| 2,218,830 A | * | 10/1940 | Rose et al. | 343/905 |
| 3,649,742 A | * | 3/1972 | Tissot | 174/70 R |
| 5,218,167 A | * | 6/1993 | Gasque, Jr. | 174/37 |
| 5,351,284 A | * | 9/1994 | Rogers | 455/562.1 |
| 6,162,992 A | * | 12/2000 | Clark et al. | 174/113 R |
| 6,298,302 B2 | | 10/2001 | Walgers et al. | |
| 6,438,561 B1 | | 8/2002 | Israni et al. | |
| 6,535,140 B1 | | 3/2003 | Goss et al. | |
| 6,535,813 B1 | | 3/2003 | Schmidt et al. | |

(Continued)

FOREIGN PATENT DOCUMENTS

| | | |
|---|---|---|
| JP | 10-267669 | 9/1998 |
| WO | WO 94/08250 | 4/1994 |

OTHER PUBLICATIONS

JVC America publication entitled JVC Enters Navigatin Category With Compact, Partable Device; from http://www.jvc.com/press/index.jsp?item=502&pageID=1, taken from web site Jan. 16, 2006, 2 pages.

(Continued)

*Primary Examiner* — Junpeng Chen
(74) *Attorney, Agent, or Firm* — Samuel M. Korte; Mohammad M. Ali

(57) ABSTRACT

An apparatus for providing power and information to an electronic device housed in a first housing. The apparatus may generally comprise a coupling element, a receiver operable to wirelessly receive information, and a cable. The coupling element is housed within a second housing that is operable to be at least partially inserted into an automobile cigarette lighter socket to acquire power therefrom. The cable extends from the second housing and is operable to couple with the electronic device or a mount associated with the electronic device to provide power from the coupling element and information from the receiver to the electronic device. The cable may generally include a first portion for housing an antenna that is operable to electrically couple with the receiver and a second portion for housing one or more wires. The one or more wires are operable to provide the power and the information to the electronic device or the mount associated with the electronic device.

25 Claims, 8 Drawing Sheets

U.S. PATENT DOCUMENTS

| | | | | |
|---|---|---|---|---|
| 6,756,884 | B1 | 6/2004 | Dijkstra | 340/425.5 |
| 6,853,915 | B2 | 2/2005 | Hubschneider et al. | |
| 6,952,643 | B2 | 10/2005 | Matsuoka et al. | |
| 7,079,074 | B2 | 7/2006 | Bierwisch et al. | 342/357.06 |
| 7,139,659 | B2 | 11/2006 | Mbekaeni et al. | 701/117 |
| 7,151,464 | B2 * | 12/2006 | Ramus | 340/12.5 |
| 7,195,267 | B1 | 3/2007 | Thompson | 280/477 |
| 7,208,683 | B2 * | 4/2007 | Clark | 174/110 R |
| 7,236,100 | B2 | 6/2007 | Obradovich et al. | 340/905 |
| 7,313,811 | B1 * | 12/2007 | Sheppard et al. | 725/143 |
| 7,696,438 | B2 * | 4/2010 | Clark et al. | 174/113 R |
| 2001/0041956 | A1 | 11/2001 | Wong et al. | 701/36 |
| 2003/0040868 | A1 | 2/2003 | Fish et al. | 701/213 |
| 2005/0131631 | A1 | 6/2005 | Nakano et al. | 701/200 |
| 2005/0137793 | A1 | 6/2005 | Krull et al. | 701/210 |
| 2006/0125613 | A1 | 6/2006 | Ko | 340/447 |
| 2006/0152424 | A1 | 7/2006 | Miyagi | 343/713 |
| 2006/0271289 | A1 | 11/2006 | Piekarz et al. | 701/213 |
| 2007/0178877 | A1 * | 8/2007 | Pemble et al. | 455/345 |
| 2007/0179702 | A1 * | 8/2007 | Pemble et al. | 701/200 |
| 2007/0238350 | A1 | 10/2007 | Azoulay | 439/501 |
| 2008/0159674 | A1 * | 7/2008 | Varonis | 384/448 |

OTHER PUBLICATIONS

Mobilewhack publication entitled "Alpine Blackbird PMD-B100 Portable Navigation Device", from http://www.mobilewhack.com/reviews/alpine_blackbird_pmd-b100_portable_navigation_device.html, taken from web site Jan. 16, 2006, 5 pages.

GNS FM9 RDS TMC Adapter, Global Navigation Systems, http://www.gns-gmbh.com/en/30_fm9.php; 1 page, published Nov. 2005.

International Search Report and the Written Opinion of the International Searching Authority from PCT/US2006/04613, mailed Jul. 9, 2008.

GNS FM9 RDS TMC Adapter, Global Navigation Systems, http://www.gns-gmbh.com/index.php?id=85&L=1; 1 page, published Nov. 2005.

* cited by examiner

TRAFFIC RECEIVER AND POWER ADAPTER FOR PORTABLE NAVIGATION DEVICES

RELATED APPLICATION

The present application claims the benefit of U.S. Provisional Patent Application Ser. No. 60/986,823, entitled "TRAFFIC RECEIVER AND POWER ADAPTER FOR PORTABLE NAVIGATION DEVICES," filed Nov. 9, 2007, which is herein incorporated by reference in its entirety.

BACKGROUND

Field of the Invention

Embodiments of the present invention relate generally to adapters that can provide traffic and other information to portable navigation devices. In some embodiments, the present invention provides an adapter operable to provide both power and information to a portable navigation device.

SUMMARY

In various embodiments, the present invention provides an apparatus for providing power and information to an electronic device housed in a first housing. The apparatus may generally comprise a coupling element, a receiver operable to wirelessly receive information, and a cable. The coupling element is housed within a second housing that is operable to be at least partially inserted into an automobile cigarette lighter socket to acquire power therefrom. The cable extends from the second housing and is operable to couple with the electronic device or a mount associated with the electronic device to provide power from the coupling element and information from the receiver to the electronic device. The cable may generally include a first portion for housing an antenna that is operable to electrically couple with the receiver and a second portion for housing one or more wires. The one or more wires are operable to provide the power and the information to the electronic device or the mount associated with the electronic device.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWING FIGURES

Various embodiments of the present invention are described in detail below with reference to the attached drawing figures, wherein.

Figure 1:
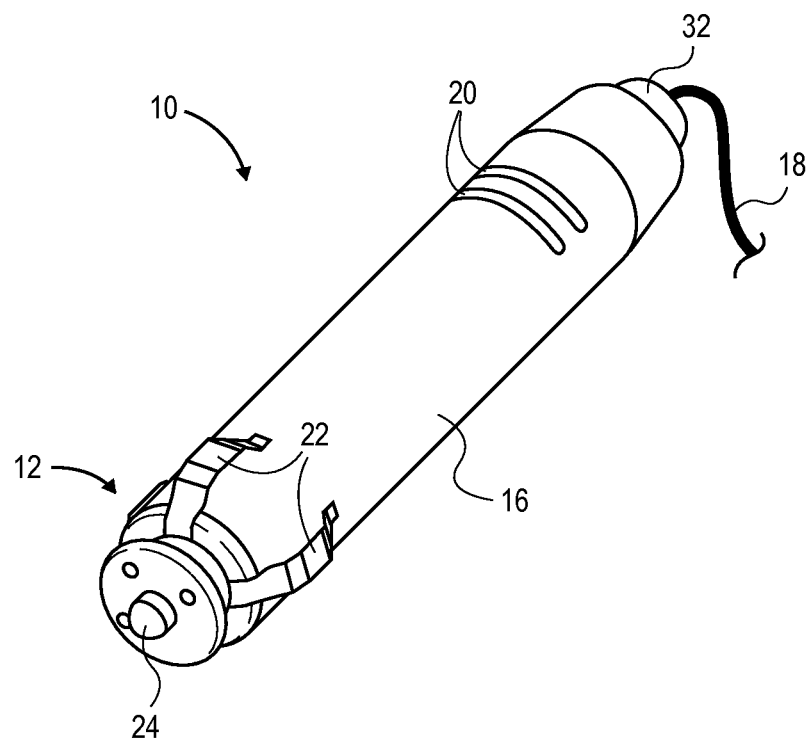
FIG. 1 is a front perspective view of an adapter configured in accordance with various preferred embodiments of the present invention.

The drawing figures do not limit the present invention to the specific embodiments disclosed and described herein. The drawings are not necessarily to scale, emphasis instead being placed upon clearly illustrating various embodiments of the invention.

DETAILED DESCRIPTION

Referring to FIGS. 1-5, an adapter 10 is shown constructed in accordance with various preferred embodiments of the present invention. As is discussed in more detail below, the adapter 10 is generally operable to couple with a power source S, such as an automobile cigarette lighter socket, and an electronic device.

The electronic device can be a navigation device D, such as a personal navigation device operable to provide various navigation functions utilizing the Global Positioning System (GPS). However, the electronic device may be any portable electronic device, including computing devices such as portable computers and personal digital assistants (PDAs), multimedia devices such as music and video players, communication devices such as cellular phones, combinations thereof, etc.

The adapter 10 generally includes a coupling element 12 operable to couple with the power source S, a receiver 14 operable to wirelessly receive information, a housing 16 operable to house the coupling element 12 and the receiver 14, and a connection element 18 for coupling the coupling element 12 and the receiver 14 with the navigation device D. In various embodiments the adapter 10 may additionally include one or more status indicators 20 operable to indicate the status of the power source S and/or various functions of the navigation device D and adapter 10.

The coupling element 12 couples with the power source S to acquire power for utilization by the navigation device D. The coupling element 12 may be operable to couple with any source of electrical energy, including alternating and direct current sources, batteries, battery packs, two and three prong electrical sockets, various plugs and sockets, combinations thereof, etc.

Due to the wide utilization of navigation devices in automobiles, the coupling element 12 can be operable to couple with and be at least partially inserted into an automobile cigarette lighter socket. Thus, the coupling element 12 may employ a generally conventional cigarette lighter adapter configuration to couple with the power source S. For instance, as shown in FIG. 1, the coupling element 12 may include one or more prongs 22 and a conducting element 24 that may be at least partially inserted into the automobile cigarette light socket to receive power, specifically 12 VDC, therefrom in a generally conventional manner.

As is also shown in FIG. 1 and discussed in more detail below, the coupling element 12 and the housing 16 may present a generally continuous cylindrical profile to facilitate insertion of the coupling element 12 into the automobile cigarette lighter socket. Further, the coupling element 12 may be detachable from the housing 16 in various embodiments to facilitate use of the adapter 10.

The receiver 14 is operable to wirelessly receive information for utilization by the navigation device D. The receiver 14 may comprise any device or combination of devices operable to wirelessly receive information, including radio-frequency (RF) receivers, optical receivers, infrared receivers, wireless fidelity (WiFi) devices, ultra wideband (UWB) devices, Global System for Mobile (GSM) communication devices, Code Division Multiple Access (CDMA) devices, Worldwide Interoperability for Microwave Access (Wi-Max) devices, other 802.11 compliant devices, combinations thereof, etc.

The receiver 14 may comprise a frequency modulated (FM) receiver 26 operable for coupling with an antenna 28 to receive FM radio signals. The receiver 14 also may comprise a processor 30 coupled with the FM receiver 26 and operable to process received signals and information.

The FM receiver 26 and processor 30 may be integral such that a single circuit package may be utilized to both receive FM signals and process the received signals. In various embodiments, the receiver 14 may comprise a S14701 broadcast radio FM tuner, distributed by SILICON LABORATORIES, or a TEA5764 FM radio with RDS and RBDS demodulation and decoding, distributed by PHILIPS SEMICONDUCTORS. Utilization of the integral FM receiver 26 and processor 30 provides manufacturing simplicity and enables the receiver 14 to be compactly housed within the housing 16 to facilitate its use within automobiles.

The antenna 28 can be integral with the connection element 18, as is discussed in more detail below, to facilitate the reception of FM signals without requiring the utilization of a discrete, external, potentially obstructing, and aesthetically unappealing antenna. However, the antenna 28 may be integral with the FM receiver 26 to further reduce the size of the receiver 14, such as where the antenna 28 and FM receiver 26 are provided on the same integrated circuit.

The receiver 14 can be operable to receive and process traffic information, such as Traffic Message Channel (TMC) formatted information. As is known in the art, traffic data, such as road conditions, weather conditions, accident locations, areas of congestion, areas of construction, etc, may be provided as TMC formatted information and broadcast over conventional FM frequencies for reception by various devices. In order to broadcast TMC formatted information and associated data without interfering with audio transmissions, TMC formatted information is normally digital encoded for transmission utilizing Radio Data System (RDS) and/or Radio Broadcast Data System (RDBS) information.

Thus, the receiver 14 can be operable to receive FM-RDS and/or FM-RDBS information utilizing the FM receiver 26 and process the received RDS and RDBS information utilizing the processor 30. Specifically, the FM receiver 26 may receive an FM-RDS signal utilizing the antenna 28 and the processor 30 may demodulate and/or decode the received FM-RDS signal to extract or otherwise generate TMC formatted information. The TMC formatted information may include an event code and a location code operable to be provided to the navigation device D through the connection element 18 to facilitate navigation. The processor 30 may process the received signals to provide TMC formatted information utilizing any conventional method, devices, or combination of devices known by those skilled in the art.

As should be appreciated by those skilled in the art, the receiver 14 is operable to receive signals presented in any format and including any information, and need not be limited to receiving traffic information utilizing RDS or RDBS. For example, the receiver 14 may be operable to receive weather information, navigation information such as locations and destinations, entertainment information such as video and audio data, network data such as TCP/IP information, combinations thereof, etc.

The receiver 14 can be operable to bi-directionally communicate, such as by utilizing the RS232 standard, with the navigation device D through the connection element 18, as discussed below in more detail. In various embodiments the receiver 14 is operable to serially and asynchronously communicate with the navigation device D utilizing the connection element 18 to enable the exchange of data and information therebetween.

Further, in various embodiments the receiver 14 may be dynamically programmed by a user or by the navigation device D. Specifically, the receiver 14 may include a memory for storing user information, device information, computer programs, operational data, TMC codes, etc, which may be dynamically modified to facilitate operation of the adapter 10 and navigation device D. For example, the user may provide an access code to be stored within the memory to enable various features of the receiver 14, such as subscription based TMC or other services.

As is discussed below in more detail, the receiver 14 can be powered by the navigation device D through the connection element 18 and is not directly coupled with the coupling element 12 for receiving power. For instance, as discussed above, the coupling element 12 is operable to provide 12 VDC, while the receiver 14 can be powered by 3.3V or 5V. Thus, the coupling element 12 may provide 12 VDC, or some derivative thereof, to the navigation device D for use, while the navigation device D may utilize the power provided by the coupling element 12 to power the receiver 14 at the desired voltage or other power level. Such a configuration reduces the required size of the housing 16 and receiver 14, as various power converting elements, such as transformers, rectifiers, regulators, dividers, etc, may be housed in the navigation device instead of in the housing 16, which may therefore be more compact and less obtrusive.

However, the receiver 14 may be powered by or through other elements, such as directly from the power source S when the coupling element 12 is inserted thereto, from an internal power supply such as a battery, from an automobile power source independent of the coupling element 12, etc. Thus, the receiver 14 need not necessarily be powered through the connection element 18 by the navigation device D.

The one or more status indicators 20 are coupled with the coupling element 12 and/or the receiver 14. In various embodiments, one of the indicators 20 may be coupled with the coupling element 12 to indicate the power status of the adapter 10 or power source S. For instance, when power is provided from the power source S, the indicator may illuminate to indicate to users that the adapter 10 is active. Similarly, when power is not provided and/or when the navigation device D is operating on battery power, the indicator may be unilluminated or illuminate a second color, to indicate that the adapter 10 is not being powered by the power source S. Specifically, the second color could be used to indicate that the adapter 10 was receiving power from the navigation device D, but not the power source S. Alternatively, the indicators 20 may separately indicate power to and from the navigation device D.

The adapter 10 may include a second indicator that is operable to indicate the status of the receiver 14. For instance, when the receiver 14 is receiving information such as RDS or TMC formatted information, processing information, or otherwise providing information to the navigation device D, one of the indicators 20 may illuminate and/or flash to indicate use of the receiver 14. Such utilization of the indicators 20 facilitates use of the navigation device D by alerting users to the presence of TMC or other navigation information.

Figure 2:
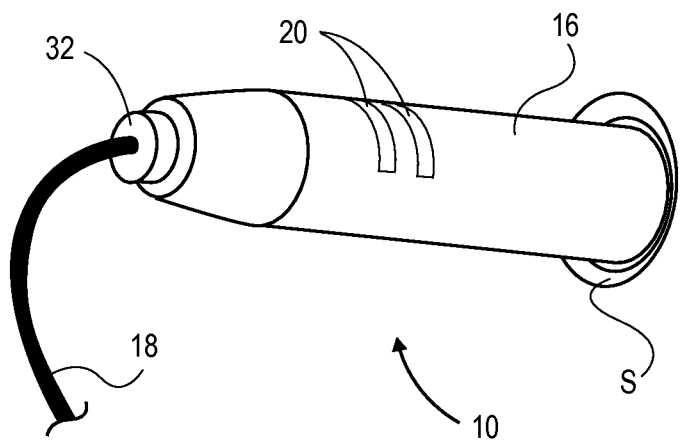
FIG. 2 is a rear perspective view of the adapter of FIG. 1, the adapter shown inserted into an automobile cigarette lighter socket.
Figure 3:
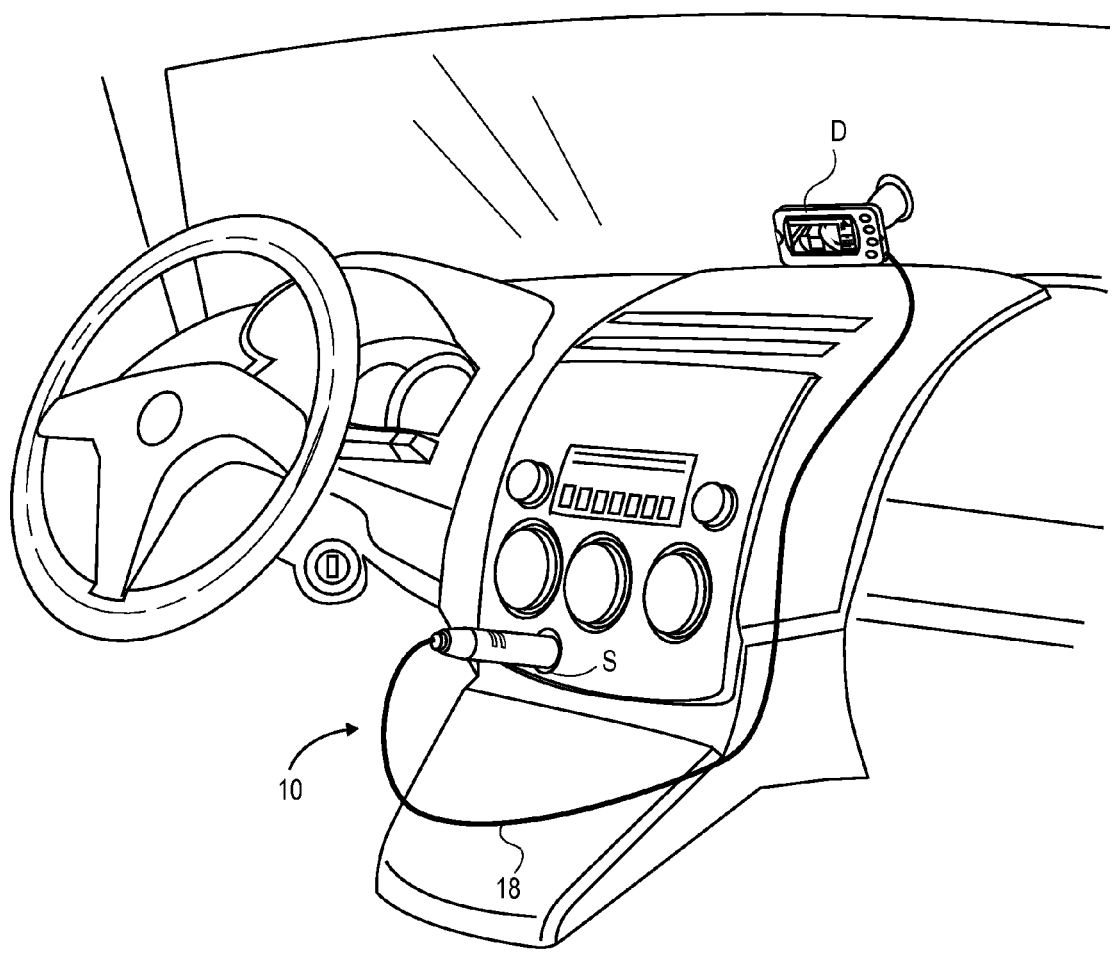
FIG. 3 is a perspective view of the adapter of FIGS. 1-2 shown coupled with a navigation device mounted to an automobile windshield.
Figure 4:
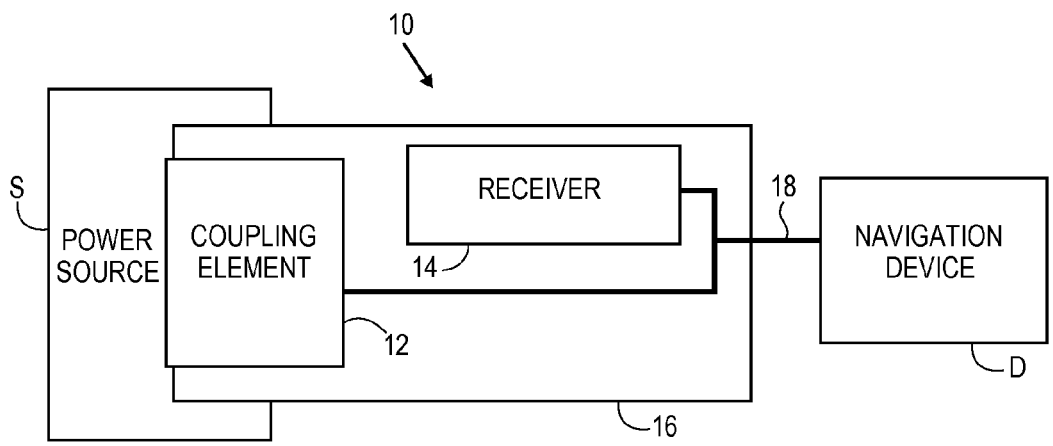
FIG. 4 is a block diagram showing some of the elements of the adapter of FIGS. 1-3.
Figure 5:
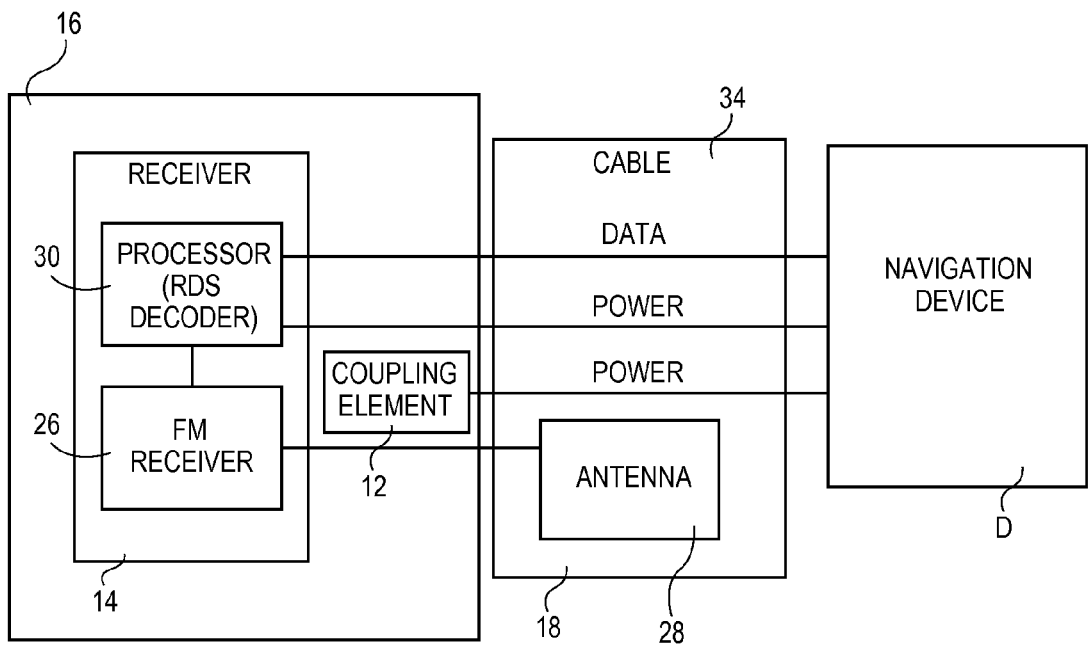
FIG. 5 is a block diagram of a coupling element, a receiver, and a cable utilized by the adapter of FIGS. 1-4.

The indicators 20 can be prominently positioned on the housing 16 to facilitate viewing during use of the adapter 10. For instance, as shown in FIGS. 1-3, each indicator 20 may comprise a semicircular band positioned around the housing 16 to enable each indicator 20 to be quickly viewed from various angles.

The housing 16 compactly houses various portions of the adapter 10, including the coupling element 12, the receiver 14, and the indicators 20. The housing 16 is discrete from the housing of the navigation device D. The housing 16 can be formed out of a rigid material, such as ABS, to provide durability and rigidity to the adapter 10. As discussed above, the housing 16 can present a substantially cylindrical profile to facilitate insertion of the coupling element 12 into the power source S. As shown in FIG. 2, the cylindrical profile enables portions of the housing 16 including the coupling element 12 to be easily inserted into the cylindrical shaped automobile cigarette lighter socket without requiring precise alignment or coupling.

Additionally, the housing 16 can entirely enclose the receiver 14 to present an aesthetically appealing appearance. For instance, as shown in FIGS. 1-2, only the prongs 22, conducting element 24, and connection element 18 extend from an outer surface of the housing, thereby presenting a sleek, readily usable, and aesthetically pleasing housing 16.

The connection element 18 is secured to the housing 16 to provide received information to the navigation device D. The connection element 18 can be a cable 34 that extends from the housing 16 at an end opposite the coupling element 12 to facilitate insertion of the coupling element 12 into the power source S. However, the connection element 18 may be any connecting element, including a cradle, link, device, or port that couples with the navigation device D. The connection element 18 is operable to provide both power received by the coupling element 12 and navigation information received and processed by the receiver 14 to the navigation device D.

As shown in FIGS. 1-3 and 5, the cable 34 can present a single and continuous sheath which encloses conductors, such as wires, for power, the antenna 28, and traffic or other dynamic information. Utilization of a single sheath to form the cable 34 reduces the number of visible wires and elements, thereby increasing the aesthetic appeal of the adapter 10 and reducing cumbersome and possibly obstructive clutter in the automobile cabin.

In various embodiments the cable 34 includes a plurality of wires to form the antenna 28, provide power to the navigation device D, and to enable bi-directional communication between the receiver 14 and the navigation device D. Specifically, the cable 34 may include one wire to provide 12V from the coupling element 12 to the navigation device D, another wire to provide 3.3V from the navigation device D to the receiver 14, another wire to provide serial data from the navigation device D to the receiver 14, another write to provide serial data from the receiver 14 to the navigation device D, a wire for digital ground, a wire for device identification, a vehicle ground wire, another wire or combination of wires to form the antenna 28, etc.

The connection element 18 may be operable to directly couple with the navigation device D utilizing various connectors, ports, and other coupling elements, and/or the connection element 18 may be operable to indirectly couple with the navigation device D through other elements, such as a cradle positioned on an automobile dashboard or windshield. For example, the cable 34 may extend from the housing 16 to the cradle and the navigational device D may be removably coupled with the cradle to utilize the adapter 10. Thus, the connection element 18 and/or cable 34 need not be directly coupled with the navigation device D.

Alternatively, the housing 16 could form the cradle, thereby supporting the navigation device D. This would be especially desirable where the cradle provides other functionality to the navigation device D, such as dead reckoning information. Particularly where the housing 16 forms the cradle, the connection element 18 can be a port or other connector designed to couple the adapter 10 with the navigation device D in close proximity. Here, the cable 34 could be used to connect the coupling element 12 to the adapter 10, and would therefore require fewer internal wires.

In any case, the cable 34 can allow the navigation device D to be mounted some distance, such as between two and six feet, from the power source S and/or receiver 14. Therefore, at least for larger vehicles, the cable is approximately six feet long. However, the cable 34 may be only four feet, or even as short as two feet, depending on the specific application. For example, where the navigation device D is to be mounted to a dashboard in close proximity to the power source S, the cable is approximately two feet long. This gives adequate mounting flexibility while minimizing extraneous cable length, which detracts from aesthetic appeal. However, to accommodate the largest range of mounting situations, while minimizing extraneous cable length, the preferable cable length appears to be approximately four feet.

Further, in various embodiments the connection element 18 may be removable from the housing 16 to facilitate storage of the adapter 10. For instance, when not in use, the connection element 18 may be removed from the housing 16 and stowed to limit the space occupied by the adapter 10 without having to remove the coupling element 12 from the power source S.

In such embodiments where the connection element 18 is removable or otherwise not an integral part of the adapter 10, the connection element 18 may include a contact 32 positioned on the housing 16 and coupled with the coupling element 12 and the receiver 14 for electrically and removably coupling with the connection element 18. The contact 32 may be a socket, plug, jack, receptacle, or any other conducting element operable to provide power from the coupling element 12 and navigation information from the receiver 14 to the connection element 18 and navigation device D. Thus, the contact 32 may be operable to receive a conventional cable, such as a RS232 compliant serial cable, a USB cable, a IEEE 1394 firewire cable, etc, to provide power and navigation information to the navigation device D. However, the contact 32 may be operable to receive special purpose cables for coupling with the navigation device D.

In use, the user couples the coupling element 12 with the power source S to supply power to the navigation device D. In embodiments where the power source S is an automobile cigarette lighter socket, the user may insert a portion of the housing 16 including the coupling element 12 into the socket to provide power to the navigation device D. Upon coupling the coupling element 12 with the power supply S, one of the indicators 20 is illuminated to indicate the existence of power.

The user may couple the adapter 10 with any electronic device, but the electronic device can be the navigation device D equipped with TMC functionality, and operable to provide, in a substantially conventional manner, geographic location information. The navigation device D may be, for example, a GPS receiver much like those provided in products by GARMIN, such as that disclosed in U.S. Pat. No. 6,434,485, which is incorporated herein by specific reference.

Figure 7:
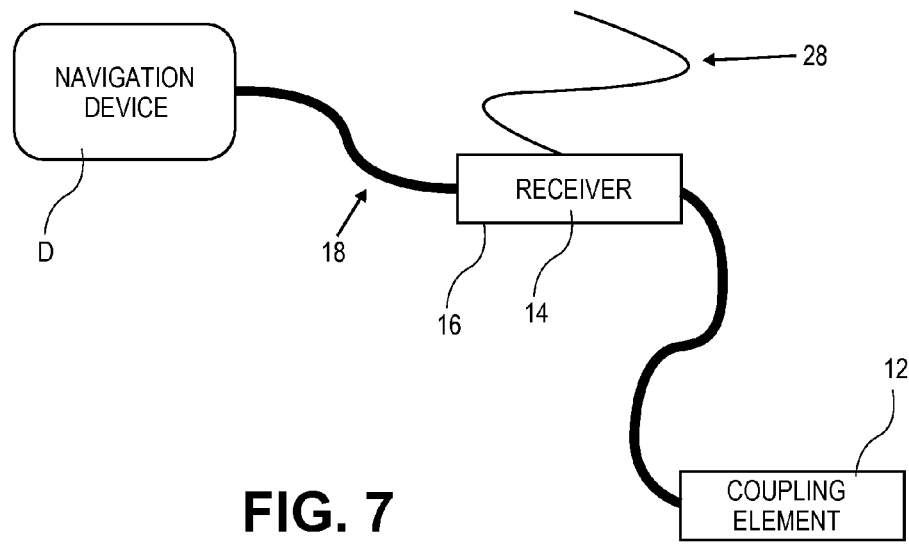
FIG. 7 is a block diagram showing an alternative embodiment of the adapter.
Figure 8:
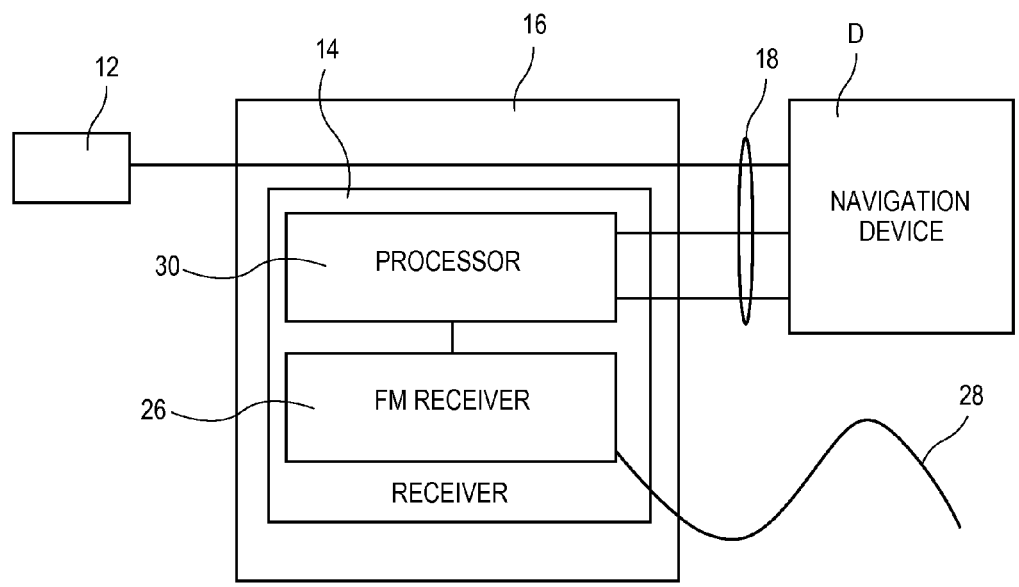
FIG. 8 is another block diagram showing the alternative embodiment of the adapter.
Figure 9:
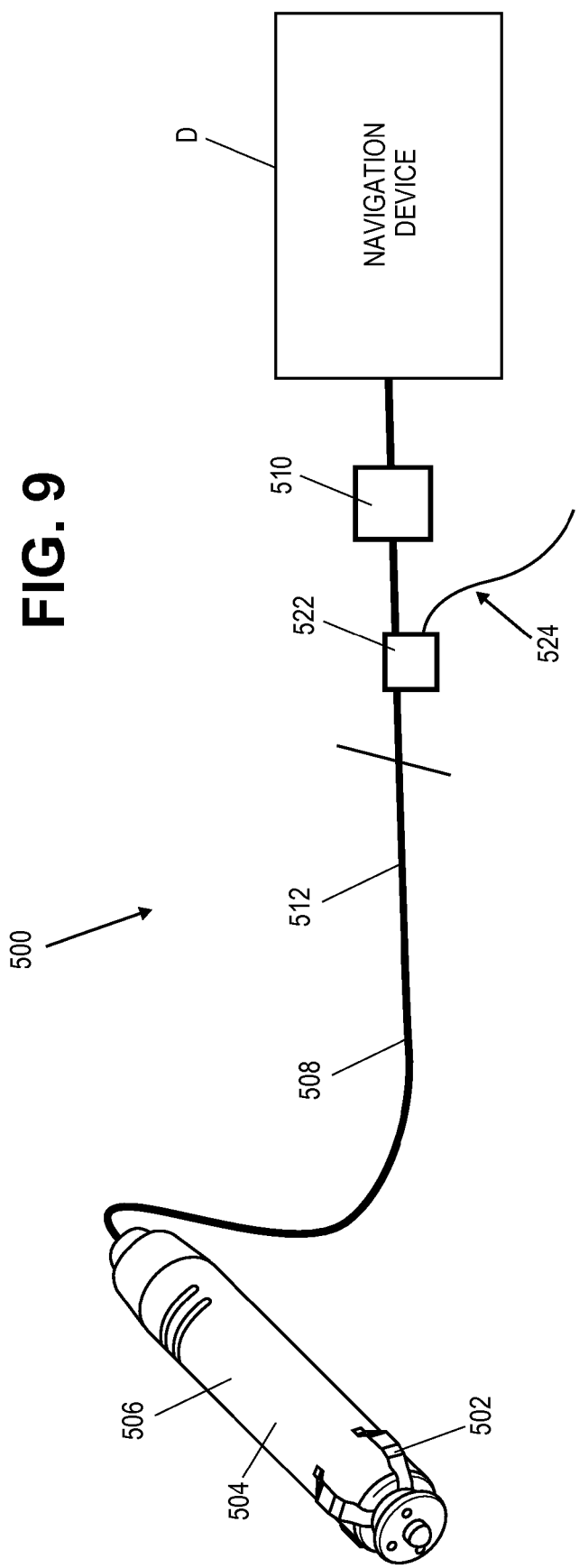
FIG. 9 is a block diagram of another adapter configured in accordance with various embodiments of the present invention.

In an alternative embodiment, as shown in FIGS. 7 and 8, the antenna 28 may be external to the receiver 14, the housing 16, and connection element 18. For example, especially were FM-RDS, FM-RDBS, or other received information signals are especially weak or otherwise difficult to receive, the receiver 14 may be located remotely from the coupling element 12 and the antenna 28 may extend from the housing 16 in order to maximize reception by the antenna 28. As shown in FIG. 7, the housing 16, containing the receiver 14, may also be remotely located with respect to the navigation device D and connected thereto by the connection element 18, such as the cable 34. However, as discussed above, the housing 16 may form a cradle for the navigation device D, and therefore be located in close proximity thereto. In this case, the receiver 14, contained in the housing 16 would connect to the navigation device D through the connection element 18, such as the port or other connector. In any case, the alternative embodiment allows the antenna 28 to be located in a more prominent signal acquisition position, in order to maximize reception and minimize interference.

In yet another embodiment, rather than extend from the housing 16, the antenna 28 could be embedded in an outwardly facing portion of the housing itself. Such an embodiment would allow the antenna 28 to be located up above a vehicle dashboard, allowing for maximum reception, while still minimizing extraneous cabling.

In general, the GPS is a satellite-based radio navigation system capable of determining continuous position, velocity, time, and direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometrical triangulation, the receiver utilizes the three known positions to determine its own two-dimensional position relative to the satellites. Acquiring a fourth satellite signal will allow the receiving device to calculate its three-dimensional position by the same geometrical calculation. The positioning and velocity data can be updated in real time on a continuous basis by an unlimited number of users.

Although GPS enabled devices are often used to describe navigational devices, it will be appreciated that satellites need not be used to determine a geographic position of a receiving unit since any receiving device capable of receiving the location from at least three transmitting locations can perform basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit. Furthermore, the navigation device D could utilize dead reckoning rather than, or in support of, GPS functionality. In this way, personal hand held devices, cell phones, intelligent appliances, intelligent apparel, and others can be readily located geographically, if appropriately equipped.

Figure 6:
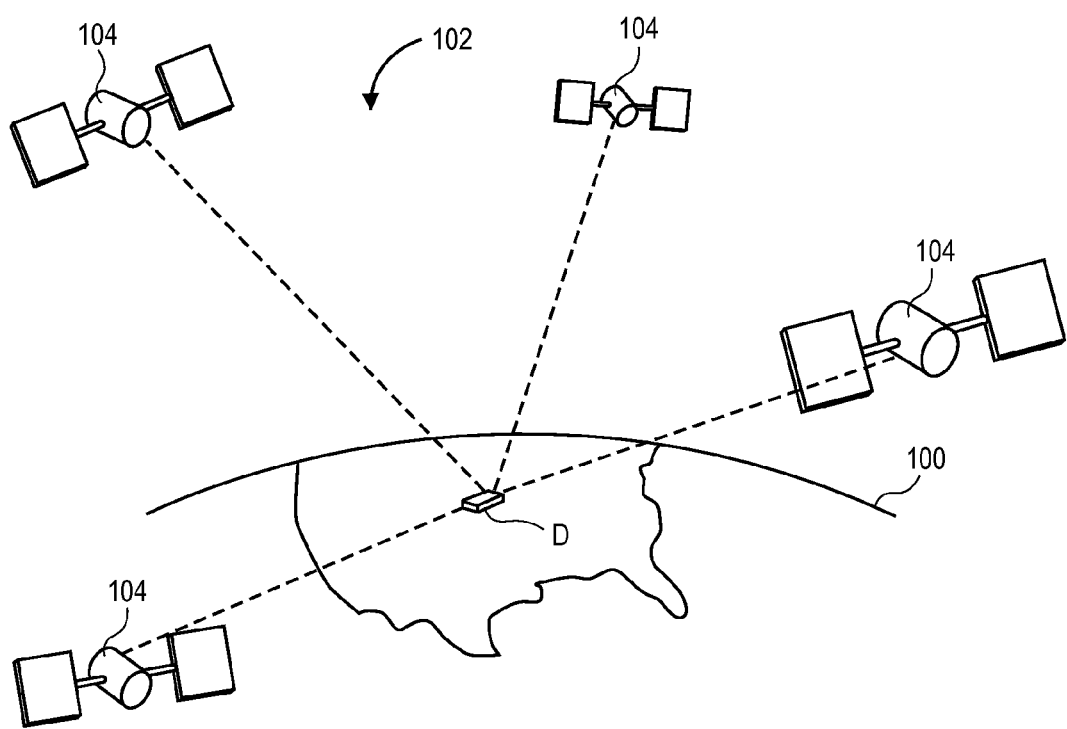
FIG. 6 is schematic diagram of a Global Positioning System (GPS) that may be utilized by various embodiments of the present invention.

FIG. 6 shows one representative view of a GPS denoted generally by reference numeral 102. A plurality of satellites 104 are in orbit about the Earth 100. The orbit of each satellite is not necessarily synchronous with the orbits of other satellites and, in fact, is likely asynchronous. The navigation device D is shown receiving spread spectrum GPS satellite signals from the various satellites 104.

The spread spectrum signals continuously transmitted from each satellite 104 utilize a highly accurate frequency standard accomplished with an extremely accurate atomic clock. Each satellite 104, as part of its data signal transmission, transmits a data stream indicative of that particular satellite and timing information. The navigation device D must acquire spread spectrum GPS satellite signals from at least three satellites for the GPS receiver device to calculate its two-dimensional position by triangulation. Acquisition of an additional signal, resulting in signals from a total of four satellites, permits the device D to calculate its three-dimensional position.

The navigation device D may include one or more processors, controllers, or other computing devices and memory for storing information accessed and/or generated by the processors or other computing devices. The navigation device D is operable to receive GPS satellite signals from the GPS satellites 104 to calculate a position of the navigation device D as a function of the signals. The navigation device D is also operable to calculate a route to a desired location, provide instructions to navigate to the desired location, display maps and other information on a display screen, and to execute other functions described herein.

Before or after coupling the coupling element 12 with the power source S, the user may couple the connection element 18 with the navigation device D. As discussed above, the user may directly couple the connection element 18 with the navigation device D and/or the user may indirectly couple the connection element 18 with the navigation device D by coupling the connection element 18 with a cradle, or other intermediate device, and then inserting the navigation device D into the cradle. The user may detach the coupling element 12 from the power source S and the connection element 18 from the navigation device D in a substantially similar manner.

After coupling the coupling element 12 with the power source S and the connection element 18 with the navigation device D, the user may operate the navigation device D in a generally conventionally manner. Further, coupling of the adapter 10 and the navigation device D enables the navigation device D to power the receiver 14 through the connection element 18.

The receiver 14 continuously and wirelessly receives information, such as traffic, weather, entertainment, and/or other dynamic information, that may be provided to the navigation device D for display thereon and/or to facilitate navigation. In various embodiments, the FM receiver 26 continuously receives FM-RDS and/or FM-RBDS signals and the processor 30 decodes the received signals to extract traffic information, such as TMC formatted traffic information. The traffic information is then provided to the navigation device D through the connection element 18.

The user may additionally utilize the navigation device D to configure the adapter 10. For example, the user may provide configuration information, such as user information, passwords, authorization codes, locations, performance information, etc, to the navigation device D, which is operable to bi-directionally communicate with the receiver 14 through the connection element 18. Similarly, the user may provide information and or otherwise configure the adapter 10 by wirelessly transmitting information to the receiver 14.

Upon receiving the information from the adapter 10, the navigation device D may provide an indication of the received information, calculate or process additional information based on the received information, store the received information in memory, etc. For instance, the navigation device D may display received traffic information on a display for utilization by the user and/or utilize received traffic information to perform route calculations, such as a detour around traffic congestion.

An adapter 500 provided by various other embodiments of the present invention is illustrated in FIGS. 9-13. The adapter 500 generally includes a coupling element 502 operable to couple with the power source S, a receiver 504 operable to receive information such as traffic information, a housing 506 operable to house the coupling element 502 and/or receiver 504, and a connection element 508 operable to couple the coupling element 502 and receiver 504 to the navigation device D. In some embodiments, the adapter 500 may additionally include a filtering element 510 to reduce interference and/or capacitive coupling between the various adapter 500 elements.

In some embodiments, the coupling element 502 and receiver 504 are similar to the coupling element 12 and receiver 14 discussed above. For example, the coupling element 502 and housing 506 may employ a generally conventional cigarette lighter adapter configuration to enable coupling with automobile cigarette lighter sockets. The receiver 504 may be integral with the housing 506 or be remotely coupled with the coupling element 502 through the connection element 508. The receiver 504 may be operable to receive TMC, MSN Direct, and/or any other information suitable for use by the navigation device D, as is discussed above in regards to the receiver 14.

The connection element 508 may be similar to the connection element 18 discussed above and include a cable 512 having an integral antenna 514. The cable 512 may provide information, such as electrical signals corresponding to received traffic information, and power to the navigation device D in addition to at least partially housing the antenna 514.

As is shown in FIGS. 10-13, the cable 512 may be configured to house the antenna 514 while limiting interference and/or capacitive coupling from the data and power carried by other portions of the cable 512. More specifically, the cable 512 can include at least two joined sections 516a, 516b, where the antenna 514 is housed within a first one of the sections 516a and various data and power wires 518 are housed in a second one of the sections 516b. The data and power wires 518 are operable to conduct signals from the coupling element 502 and/or receiver 504 to the navigation device D. The data and power wires 519 may also carry signals, including power for the receiver 504, from the navigation device D to the coupling element 502 and receiver 504. Further, the antenna 514 and data and power wires 518 may each by electrically insulated utilizing conventional methods.

Figure 10:
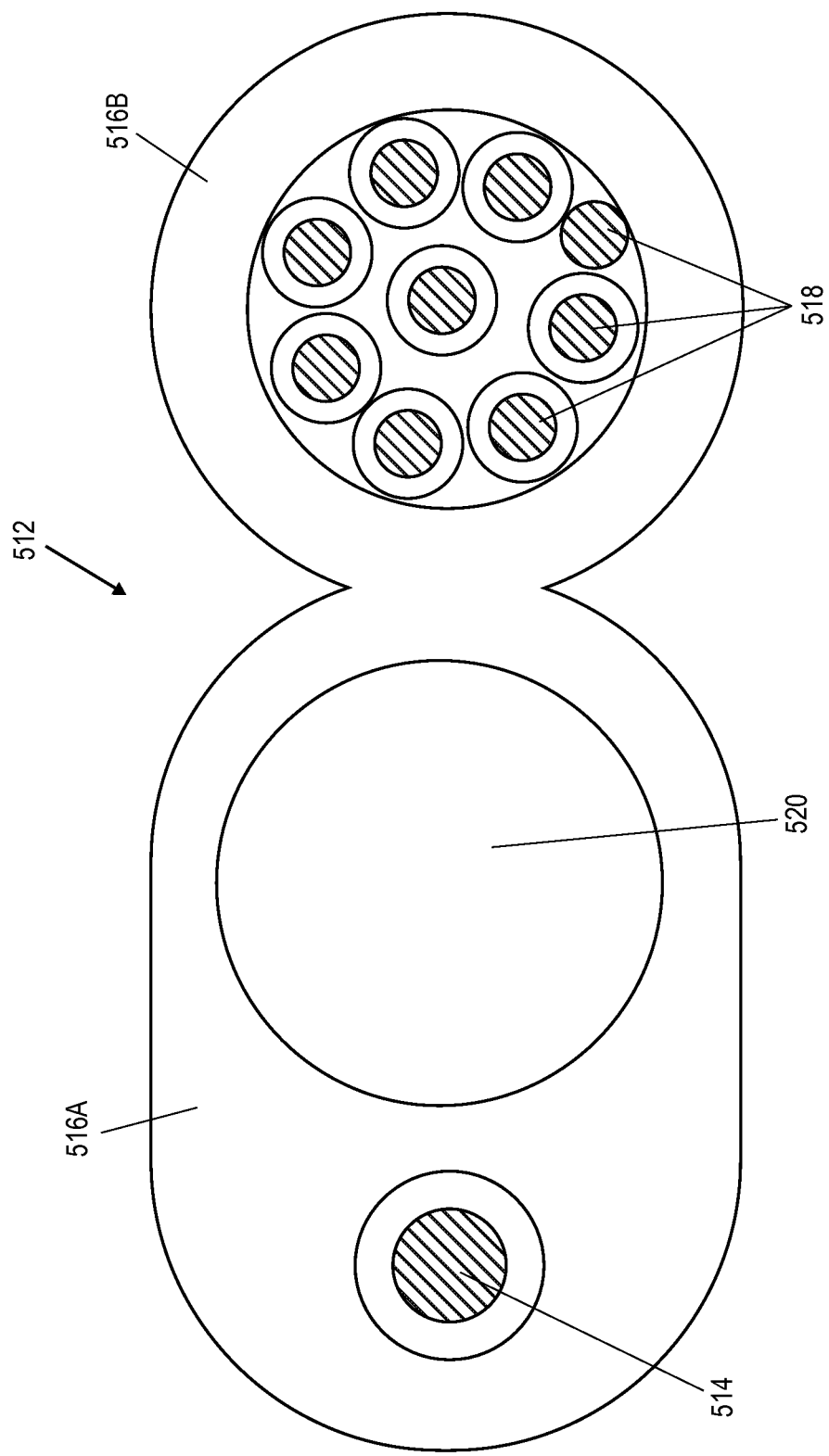
FIG. 10 is a cross sectional view of a cable utilized by the adapter of FIG. 9.

In some embodiments, as illustrated in FIG. 10, the first section 516a may include an air gap 520 disposed between the antenna 514 and second section 516b to limit electrical interference and/or capacitive coupling between the antenna 514 and data and power wires 518. Utilization of the air gap 520 enables the cable 512 to function as both an antenna and a transmission line. The portions of the cable 512 surrounding the air gap 520 provide support between the antenna 514 and wires 518 without requiring installation of solid insulating elements within the cable 512 or first section 516a.

The configuration of the cable 512 also enables the cable 512 to present an aesthetically pleasing appearance similar to common electrical cables. Further, utilization of the joined sections 516a, 516b limits the probability that the cable 512 will kink, tear, or be knotted as the cable 512 may be formed of semi-rigid materials to limit bending of the first section 516a relative to the second section 516b.

Figure 11:
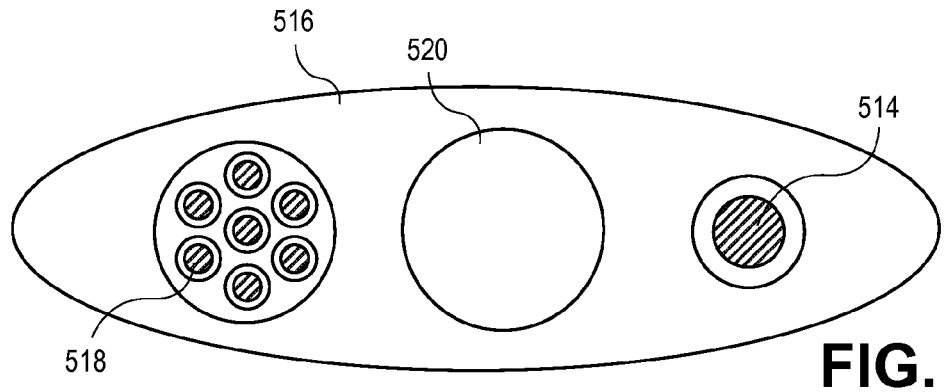
FIG. 11 is a cross sectional view of another cable operable to be utilized by the adapter of FIG. 9.
Figure 12:
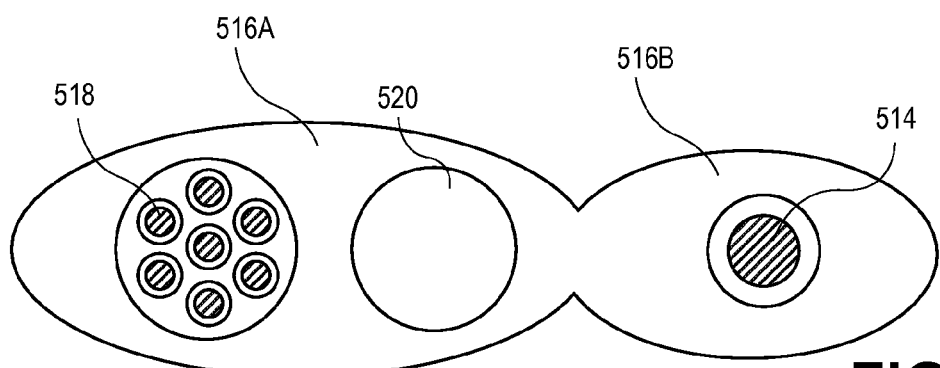
FIG. 12 is a cross sectional view of another cable operable to be utilized by the adapter of FIG. 9.
Figure 13:
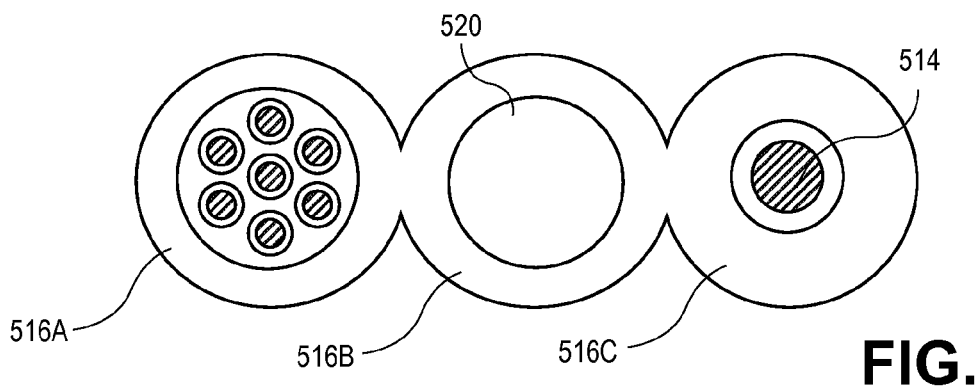
FIG. 13 is a cross sectional view of another cable operable to be utilized by the adapter of FIG. 9.

The cable 512 may present any configuration and is not limited to the two-section configuration discussed above. For example, as is illustrated in FIGS. 11-13, the cable 512 may have any number of sections and the antenna 514, wires 518, and air gap 520 may be arranged in any configuration where the air gap 520 is generally positioned between the antenna 514 and wires 518. Thus, the antenna 514, wires 518, and air gap 520 may be disposed within the same cable section 516 (FIG. 11), the air gap 520 and wires 518 may be disposed within the same cable section 516a (FIG. 12), and/or the antenna 514, wires 518, and air gap 520 may each be disposed within separate sections 516a, 516b, 516c (FIG. 13).

In some embodiments, the cable 512 may include an antenna connection plug 522 to allow the antenna 514 housed within the cable 512 to be coupled with an external antenna 524 to increase the ability of the receiver 504 to receive signals. The antenna connection plug 522 may allow signals from the external antenna 524 to pass down the integral antenna 514 to form a transmission line to the receiver 504. The user may plug the external antenna 524 into the antenna connection plug 522 after the adapter 500 has been mounted in the user's vehicle when additional signal reception capabilities are desirable. The antenna connection plug 522 may be positioned on the cable 512 on an end away from the receiver 14 to maximize the length and signal reception capabilities of the combined antenna configuration.

The filtering element 510 is operable to at least partially filter electrical signals that pass through the cable 512, and specifically the data and power wires 518, to limit interference with the antenna 514 and provide suitable signals for use by the navigation device D. For example, the filtering element 510 may filter, transform, and/or convert power provided by the coupling element 502 through the cable 512 for appropriate use by the navigation device D. The filtering element 510 may also filter, transform, and/or convert signals provided by the receiver 504 through the cable 512 for use by the navigation device D and/or filter, transform, and/or convert signals provided by the navigation device D through the cable 512 to the coupling element 502 and/or receiver 504.

In some embodiments, the filtering element 510 can be positioned on the cable 512 opposite the coupling element 502, receiver 504, and housing 506 to further reduce undesirable interference between the various electrical components of the adapter 500. However, the filtering element 510 may be positioned within any portion of the adapter 500, including within the housing 506, and is not limited to positions on the cable 512 opposite the coupling element 502, receiver 504, and housing 506.

To the various features and functions discussed above regarding the adapter 10 may used by the adapter 500 in addition to, or as an alternative to, the various features and functions discussed above regarding the adapter 500.

Although the invention has been described with reference to the preferred embodiment illustrated in the attached drawing figures, it is noted that equivalents may be employed and substitutions made herein without departing from the scope of the invention as recited in the claims. For instance, the adapter 10 or adapter 500 of the present invention may be coupled with any device to provide power and wirelessly received information thereto, and need not be limited to providing navigation and traffic information to navigation devices.

What is claimed is:

1. An apparatus for providing power and information to an electronic device housed in a first housing, the apparatus comprising:
 a coupling element housed within a second housing, the second housing operable to be at least partially inserted into an automobile cigarette lighter socket to acquire power therefrom;
 a receiver operable to wirelessly receive information; and
 a cable extending from the second housing and operable to couple with the electronic device or a mount associated with the electronic device to provide power from the coupling element and information from the receiver to the electronic device, the cable including—
  a first portion for housing an antenna having a cross-sectional area, the antenna operable to electrically couple with the receiver,
  a second portion for housing one or more wires, the one or more wires operable to provide the power and the information to the electronic device or the mount associated with the electronic device, and
  an air gap of a cross-sectional area greater than the cross-sectional area of the antenna disposed between the antenna and the one or more wires.

2. The apparatus of claim 1, wherein the receiver is housed within the second housing.

3. The apparatus of claim 1, wherein the receiver is housed separate from the second housing and coupled with the cable.

4. The apparatus of claim 1, wherein the receiver is a traffic receiver operable to receive TMC formatted traffic information.

5. The apparatus of claim 1, wherein the receiver is a traffic receiver operable to receive MSN DIRECT formatted traffic information.

6. The apparatus of claim 1, wherein the air gap is disposed within the first portion of the cable.

7. The apparatus of claim 1, wherein the air gap is disposed within the second portion of the cable.

8. The apparatus of claim 1, wherein the cable further includes an antenna connection plug operable to be removably coupled with an external antenna to allow signals from the external antenna to pass down the integral antenna to form a transmission line to the receiver.

9. The apparatus of claim 1, further including a filtering element operable to filter power passing through the cable, the filtering element being disposed on the cable towards an end opposite the coupling element.

10. An apparatus for providing power and information to an electronic device housed in a first housing, the apparatus comprising:
 a coupling element housed within a second housing, the second housing operable to be at least partially inserted into an automobile cigarette lighter socket to acquire power therefrom;
 a traffic receiver housed within the second housing and operable to wirelessly receive traffic information; and
 a cable extending from the second housing and operable to couple with the electronic device or a mount associated with the electronic device to provide power from the coupling element and traffic information from the receiver to the electronic device, the cable including—
  a first portion for housing an antenna having a cross-sectional area, the antenna operable to electrically couple with the receiver,
  a second portion for housing one or more wires, the one or more wires operable to provide the power and the traffic information to the electronic device or the mount associated with the electronic device, and
  an air gap of a cross-sectional area greater than the cross-sectional area of the antenna disposed between the antenna and the one or more wires.

11. The apparatus of claim 10, wherein the receiver is operable to receive TMC formatted traffic information.

12. The apparatus of claim 10, wherein the receiver is operable to receive MSN DIRECT formatted traffic information.

13. The apparatus of claim 10, wherein the air gap is disposed within the first portion of the cable.

14. The apparatus of claim 10, wherein the air gap is disposed within the second portion of the cable.

15. The apparatus of claim 10, wherein the cable further includes an antenna connection plug operable to be removably coupled with an external antenna to allow signals from the external antenna to pass down the integral antenna to form a transmission line to the receiver.

16. The apparatus of claim 10, further including a filtering element operable to filter power passing through the cable, the filtering element being disposed on the cable towards an end opposite the coupling element.

17. An apparatus for providing power and information to an electronic device housed in a first housing, the apparatus comprising:
 a coupling element housed within a second housing, the second housing operable to be at least partially inserted into an automobile cigarette lighter socket to acquire power therefrom;
 a traffic receiver housed within the second housing and operable to wirelessly receive traffic information;
 a cable extending from the second housing and operable to couple with the electronic device or a mount associated with the electronic device to provide power from the coupling element and traffic information from the receiver to the electronic device, the cable including—
  a first portion for housing an antenna having a cross-sectional area, the antenna operable to electrically couple with the receiver,
  a second portion for housing one or more wires, the one or more wires operable to provide the power and the traffic information to the electronic device or the mount associated with the electronic device,
  an air gap of a cross-sectional area greater than the cross-sectional area of the antenna disposed between the antenna and the one or more wires, and
  an antenna connection plug operable to be removably coupled with an external antenna to allow signals from the external antenna to pass down the integral antenna to form a transmission line to the receiver; and
 a filtering element operable to filter power passing through the cable, the filtering element being disposed on the cable towards an end opposite the coupling element.

18. The apparatus of claim 17, wherein the air gap is disposed within the first portion of the cable.

19. The apparatus of claim 17, wherein the air gap is disposed within the second portion of the cable.

20. The apparatus of claim 17, wherein the cable includes a third portion positioned between the first portion and the second portion, the third portion including the air gap.

21. A cable operable to electrically couple a cigarette lighter adapter and an electronic device or a mount associated with the electronic device, the cable comprising:
- a first portion for housing an antenna having a cross-sectional area operable to be utilized by a receiver associated with the cigarette lighter adapter;
- a second portion for housing one or more wires, the one or more wires operable to provide power and information from the cigarette lighter adapter to the electronic device or the mount associated with the electronic device; and
- an air gap of a cross-sectional area greater than the cross-sectional area of the antenna disposed between the antenna and the one or more wires.

22. The cable of claim 21, further including an antenna connection plug operable to be removably coupled with an external antenna to allow signals from the external antenna to pass down the integral antenna to form a transmission line.

23. The cable of claim 21, further including a filtering element operable to filter power passing through the cable, the filtering element being disposed on the cable towards an end opposite the cigarette lighter adapter.

24. The cable of claim 21, wherein the air gap is disposed within the first portion of the cable.

25. The cable of claim 21, wherein the air gap is disposed within the second portion of the cable.

* * * * *